United States Patent
Daniele et al.

(10) Patent No.: US 7,076,007 B1
(45) Date of Patent: Jul. 11, 2006

(54) DATA TRANSMISSION METHOD USING REPEATED SETS OF SPREADING SEQUENCES, CORRESPONDING TRANSMITTER AND RECEIVER

(75) Inventors: Norbert Daniele, Montbonnot (FR); Sébastien Leveque, La Cote Saint André (FR); Dominique Noguet, Grenoble (FR); Jean-René Lequepeys, Fontaine (FR)

(73) Assignee: Commissariat a l'Energie Atomique, Paris (FR)

( * ) Notice: Subject to any disclaimer, the term of this patent is extended or adjusted under 35 U.S.C. 154(b) by 872 days.

(21) Appl. No.: 10/030,158

(22) PCT Filed: Jul. 28, 2000

(86) PCT No.: PCT/FR00/02177

§ 371 (c)(1),
(2), (4) Date: Jan. 30, 2002

(87) PCT Pub. No.: WO01/10051

PCT Pub. Date: Feb. 8, 2001

(30) Foreign Application Priority Data

Jul. 30, 1999 (FR) .................................. 99 09947

(51) Int. Cl.
*H04B 1/707* (2006.01)

(52) U.S. Cl. ................. 375/341; 375/146; 375/147
(58) Field of Classification Search ........ 375/141–143, 375/147, 150, 152, 343; 370/320, 335, 342
See application file for complete search history.

(56) References Cited

U.S. PATENT DOCUMENTS 6,160,803 A * 12/2000 Yuen et al. .................. 370/342
2002/0196842 A1 * 12/2002 Onggosanusi et al. ...... 375/148

FOREIGN PATENT DOCUMENTS

EP 0 693 834 1/1996
EP 0 708 534 4/1996

OTHER PUBLICATIONS

T. Wada, et al., IEICE Transactions on Fundamentals of Electronics, vol. E80-A, No. 12, XP-000768674, pp. 2477-2483, "A Constant Amplitude Coding for Orthogonal Multi-Code CDMA Systems", Dec. 1, 1997.

* cited by examiner

Primary Examiner—Young T. Tse
(74) Attorney, Agent, or Firm—Oblon, Spivak, McClelland, Maier & Neustadt, P.C.

(57) ABSTRACT

A data transmission process using repetitive sets of spreading sequences, and corresponding transmitter and receiver. Spectrum spreading is performed on symbol packets using sets of pseudo-random sequences used repetitively, thus reducing interference between symbols.

6 Claims, 3 Drawing Sheets

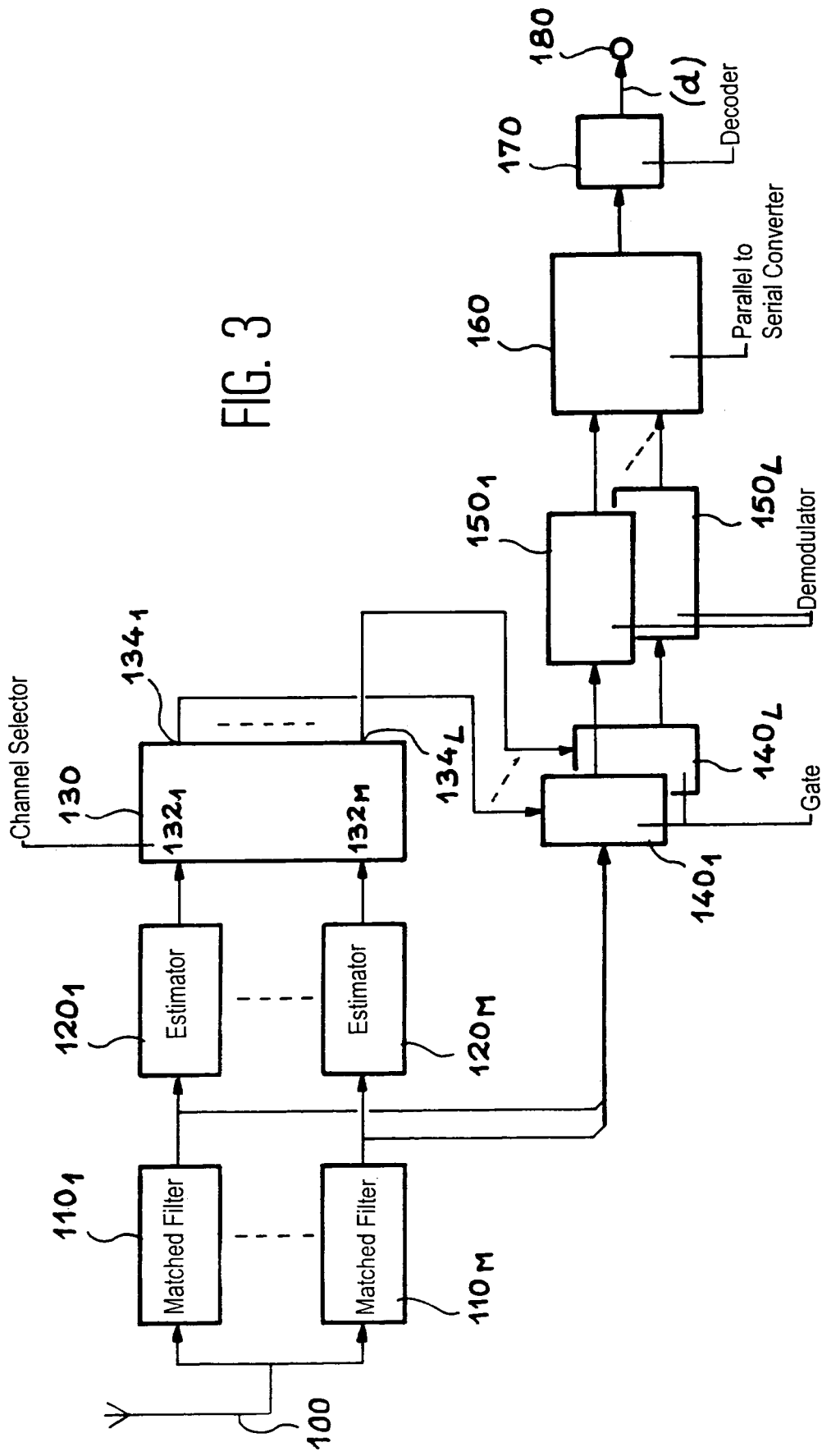

DATA TRANSMISSION METHOD USING REPEATED SETS OF SPREADING SEQUENCES, CORRESPONDING TRANSMITTER AND RECEIVER

TECHNICAL DOMAIN

The purpose of this invention is a process for transmission of data using repetitive sets of spreading sequences, and a corresponding transmitter and receiver.

The invention is broadly applied for digital communications and more particularly for Wireless Local Area Networks (WLANs), Wireless subscriber Local Loops (WLL), mobile telephony, intelligent building management systems and remote charging, communication for transport, cable television, multimedia service on cable networks, etc.

STATE OF PRIOR ART

The invention relates to the spectrum spreading technique. It is known that this technique consists of modulating a digital symbol to be transmitted by a pseudo random sequence known to the user. Each sequence is composed of N elements called "chips" that have a duration of one $N^{th}$ of the duration of a symbol. The result is a signal for which the spectrum is spread over a range N times wider than the range of the original signal. On reception, demodulation consists of correlating the received signal with the sequence used in sending to find the initial symbol.

This technique has many advantages, but it cannot overcome a disadvantage related to an interference effect between symbols which originates as follows. In a radio-electric channel, the wave that propagates from the transmitter to the receiver may follow various paths such that several signals reach the receiver at different time, with different amplitudes and phases, for the same transmitted signal. Therefore the response of the channel to the transmitted signal is spread. Since the sent signal is usually short, it can be treated like a pulse and it is then referred to as a pulse response. In high throughput systems, these various replicas of the same signal can interfere with other signals.

FIG. 1 illustrates this phenomenon. It shows the pulse response h(t) of a channel as a function of time. On part A, it is assumed that a pulse was transmitted at a given time and that a first signal $a_1$ was received with a given delay $\tau_1$, followed by a replica $a_2$ at time $\tau_1+Tm$, where Tm is the time by which the second path lags behind the first. On part B, it is assumed that a second signal was sent after an interval Ts equal to the duration of a symbol and it is also assumed that this interval is equal to the delay Tm. It is also assumed that the properties of the channel are not modified within the interval Ts, in other words the delay $\tau_2$ is equal to $\tau_1$ and $T_m$ remains constant. A signal $b_1$ is then received at time $\tau_2$ followed by a replica $b_2$ at time $\tau_2+T_m$.

Since it is assumed that Ts=Tm, it is obvious that the signals $a_2$ and $b_1$ will interfere and degrade reception. This source of degradation can be avoided by taking steps such that $b_1$ appears beyond $a_2$, in other words the duration Ts of the symbols is greater than the spreading Tm of the pulse response. In other words, the symbol flow rate must be less than 1/Tm. The constraint on the flow rate is greater when the pulse response is spread more.

The purpose of the invention is to overcome this disadvantage. By reducing the interference phenomenon between symbols, the invention enables higher flow rates in environments in which spreading of the pulse response of the channel is much greater than the duration of the symbol (up to 16 times in an example described later).

Document EP-A-0 693 834 describes a CDMA type mobile radiocommunication system in which the base station/mobile station link uses one or the other spreading sequence, the sequence being used in sending being identified such that the mobile station can unspread the received signal. The signal can be transmitted on three parallel channels using three different codes, to increase the information flow rate.

DESCRIPTION OF THE INVENTION

The invention recommends that successive symbols should be processed with different pseudo random sequences in order to reduce the risks of interference between symbols, since this makes it possible to better discriminate received signals on reception. According to the invention, the number of different successive sequences is limited to a fixed number S. Beyond S sequences, the previously used sequences are reused. In other words, packets of S symbols can be processed by repetitive sets of S sequences. The result is that the time interval after which the same pseudo random sequence is repeated is no longer Ts, but becomes S times Ts. Therefore the constraint on the duration of the symbol is no longer Ts>Tm, but becomes STs>Tm. In terms of throughput, this means that for a given spreading, the authorized throughput is S times higher than in prior art. The upper limit is no longer 1/Tm, but becomes S/Tm.

This process that consists of processing packets of S symbols in repetitive sets of S pseudo random sequences can be further improved by processing several packets of S symbols in parallel, each with different sequence sets.

Therefore, more precisely, the purpose of the invention is a process for data transmission by spectrum spreading in which:

in sending: symbols are built up from the data to be transmitted, and are modulated by spectrum spreading using pseudo-random sequences, on reception: the received signal is correlated with the pseudo-random sequences used in sending, the symbols sent are found and the data are restored, this process being characterized in that:

a) in sending:
   i) a set of S successive different pseudo-random sequences is built up, in which S is equal to at least 2,
   ii) the symbols to be transmitted are grouped into successive packets each containing S symbols,
   iii) the S successive symbols of a packet are modulated by the S successive pseudo-random sequences of the set of sequences,
   iv) operation iii) is repeated for successive packets of S symbols, the pseudo-random sequences in the set thus being used repetitively, b) on reception:

the received signal is correlated with each of the S pseudo-random sequences used in sending, the successive packets of symbols are restored and the corresponding data are restored.

The conversion made during transmission could be a summation.

In one particular embodiment, several packets of S symbols are processed in parallel.

Another purpose of the invention is a transmitter and a receiver for embodiment of this process.

BRIEF DESCRIPTION OF THE DRAWINGS

FIG. 3 shows an embodiment of a receiver according to the invention.

DESCRIPTION OF PARTICULAR EMBODIMENTS

Figure 1:
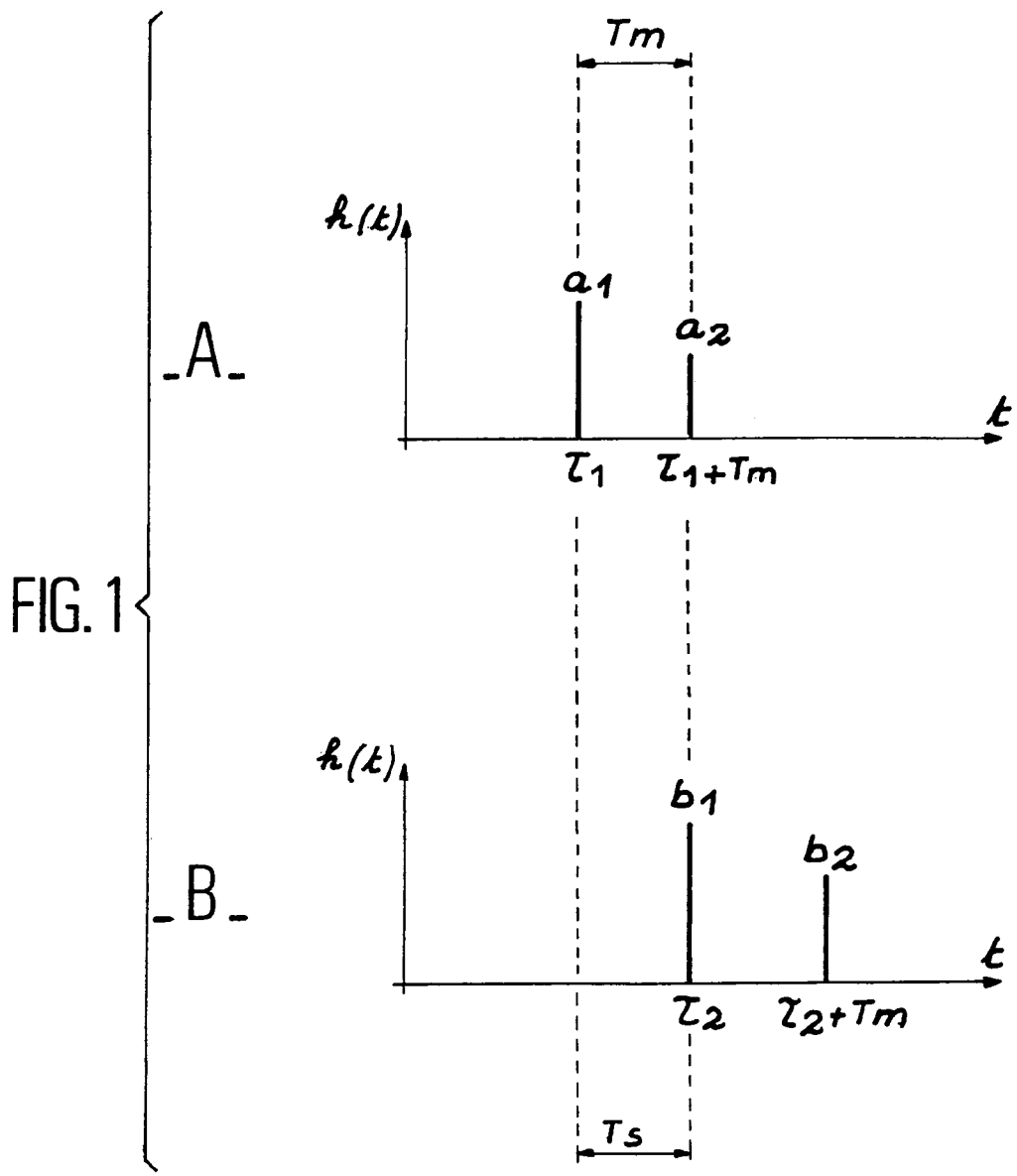
FIG. 1, already described, illustrates the interference phenomenon between symbols.

Data to be transmitted are firstly organized into symbols using standard techniques. Each symbol may include one or several bits. The symbols are then organized in packets of S. If required, parallel processing can also be carried out, L packets of S symbols are used in parallel giving a total of M=LS symbols. The following symbols are organized in the same way to build up a new set of M symbols and so on.

Table I illustrates this series-parallel organization. Each box represents a symbol. The first set of symbols is denoted $$S_{ij}^1$$

where i denotes the row in the table, in other words the rank of the packet (where i varies from 1 to L) and j is the column, in other words the rank in the packet (where j varies from 1 to S). In the second set, the LS symbols are denoted $$S_{ij}^2$$

and so on.

TABLE I

| i | 1 | 2 | S | 1 | 2 | S | | 1 | 2 | S |
|---|---|---|---|---|---|---|---|---|---|---|
| 1 | $S_{11}^1$ | $S_{12}^1$ | $S_{1S}^1$ | $S_{11}^2$ | $S_{12}^2$ | $S_{1S}^2$ | | $S_{1S}^2$ | $S_{11}^3$ | |
| 2 | $S_{21}^1$ | $S_{22}^1$ | $S_{2S}^1$ | $S_{21}^2$ | $S_{22}^2$ | $S_{LS}^2$ | | $S_{LS}^2$ | $S_{21}^3$ | |
| | | | $S_{ij}^1$ | | | | | $S_{ij}^2$ | | |
| L | $S_{L1}^1$ | $S_{L2}^1$ | $S_{Ls}^1$ | $S_{L1}^2$ | $S_{L2}^2$ | $S_{LS}^2$ | | $S_{LS}^2$ | $S_{L1}^3$ | |

All these symbols are processed by spectrum spreading using LS different pseudo-random sequences, preferably orthogonal. These sequences are organized as shown in table II. They are denoted $C_{ij}$, where i varies from 1 to L and j varies from 1 to S.

TABLE II

| | j | | |
|---|---|---|---|
| i | 1 | 2 | S |
| 1 | $C_{11}$ | $C_{12}$ | $C_{1S}$ |
| 2 | $C_{21}$ | $C_{22}$ | $C_{2S}$ |
| | | $C_{ij}$ | |
| L | $C_{L1}$ | $C_{L2}$ | $C_{LS}$ |

A symbol $S_{ij}$ in table I is processed by the corresponding pseudo-random sequence $C_{ij}$ in table II. When the M sequences have been used for a set of M symbols, the same sequences are reused for the next set of M symbols and so on. Therefore, the interval at which sequences are reused is $ST_S$.

Some numerical examples are given for explanatory purposes to illustrate the advantages provided by the invention; these examples are in no way restrictive. It is assumed that work is done with a binary flow rate of 2 Mbits/s in QPSK (Quaternary Phase Shift Keying) modulation. Therefore the number of bits per symbol is 2. The duration Ts of a symbol is 1 μS. With a process in accordance with the state of prior art, this would mean that spreading of the channel Tm should be limited to 1 μs. The invention uses L channels in parallel (where L=M/S). Therefore the number of bits transmitted in a symbol period Ts is equal to m=2 L. Table III contains a few examples of maximum spreading $Tm_{max}$ that can be allowed for two values of M (8 and 16), and 3 values of S (4, 8 and 16 respectively) for each.

TABLE III

| | M = 8 | M = 16 |
|---|---|---|
| S = 4 | m = 4 bits/symb | m = 8 bits/symb |
| | $Tm_{max}$ = 8 μs | $Tm_{max}$ = 16 μs |
| S = 8 | m = 2 bits/symb | m = 4 bits/symb |
| | $Tm_{max}$ = 8 μs | $Tm_{max}$ = 16 μs |
| S = 16 | | m = 2 bits/symb |
| | | $Tm_{max}$ = 16 μs |

Figure 2:
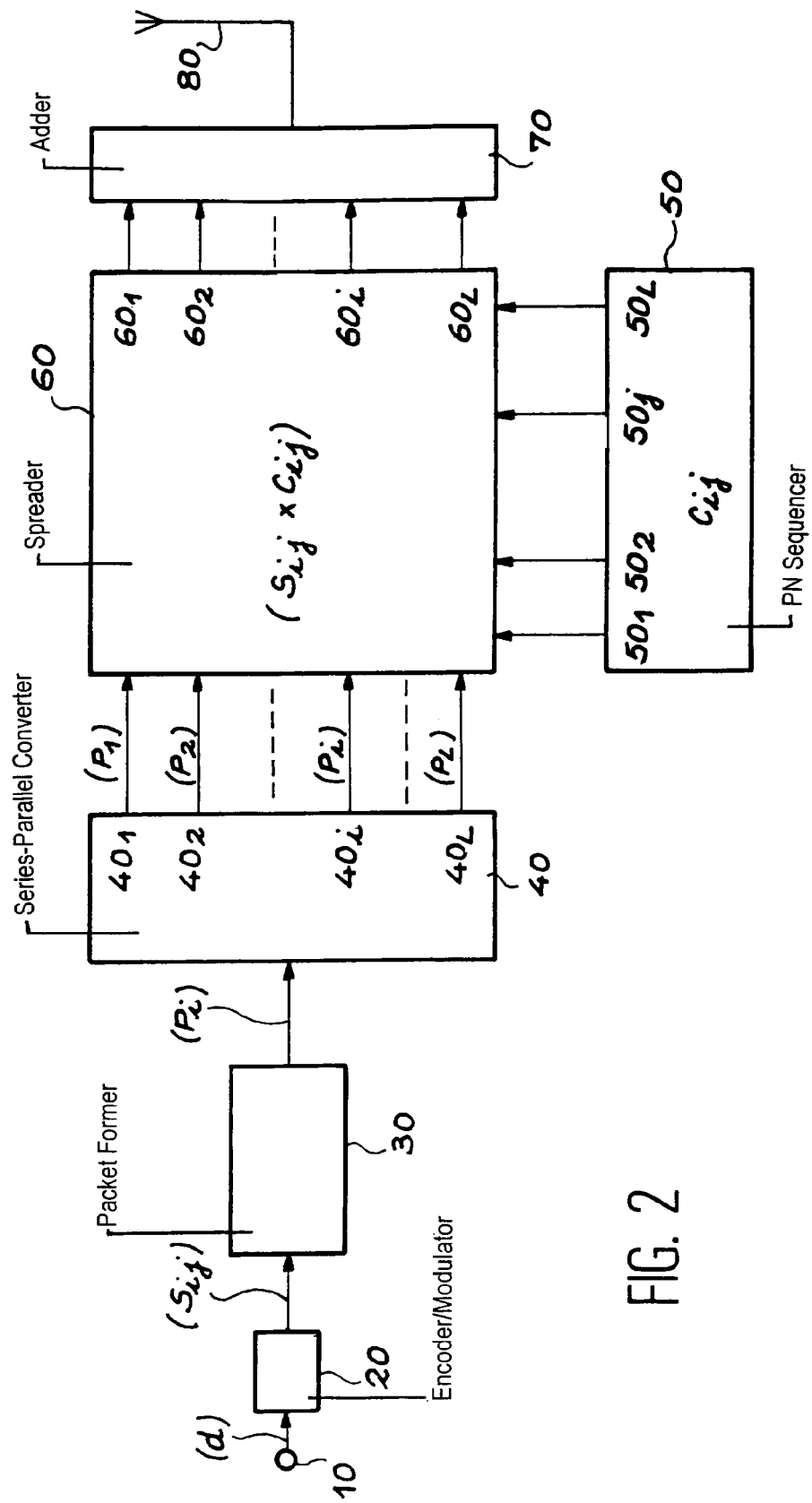
FIG. 2 shows an embodiment of a transmitter according to the invention.

FIGS. 2 and 3 illustrate example embodiments of a transmitter and a receiver according to the invention. In FIG. 2, the transmitter comprises a general input 10 into which data d to be transmitted are input, a circuit 20 transforming these data into symbols (it may be phase shift keying (PSK) modulator), a means 30 of forming packets each containing S symbols, namely $P_i$ (i varying from 1 to L). In the variant illustrated, the transmitter comprises a series-parallel converter 40 with L outputs $40_1$, $40_2$, ..., $40_i$, ..., $40_L$ outputting L packets $P_i$, a table 50 of pseudo-random sequences $C_{ij}$, with L outputs $50_1$, $50_2$, ..., $50_i$, ..., $50_L$ outputting L sets of sequences, a circuit 60 of spreading symbols $S_{ij}$ with sequences $C_{ij}$, this circuit having L outputs $60_1$, $60_2$, ..., $60_i$, ..., $60_L$ outputting spread spectrum symbols, an adder 70 and finally transmission means symbolized by an antenna 80.

The receiver shown in FIG. 3 comprises reception means symbolized by the antenna 100, a bank of M matched filters $110_1$, ..., $110_M$, each of these filters being matched to one of the pseudo-random sequences $C_{ij}$ used in sending, a bank of M circuits $120_1$, ..., $120_M$ estimating the energy (or the amplitude) of signals output by the previous matched filters, a circuit 130 with M inputs $132_1$, ..., $132_M$ and L outputs $134_1$, ..., $134_L$ determining which of the M input channels contain maximum energy and outputting a selection signal on one or several of the L outputs, L circuits 140₁, ..., 140_L with M inputs connected to the outputs of M matched filters and selecting one among M inputs as a function of the received selection signal, L demodulators 150₁, ... 150_L, for example of the PSK type, a circuit 160 putting L packets of symbols output by the demodulators into series, a circuit 170 restoring data d on a general output 180.

Processing in parallel is simply an option, the essential feature of the invention being that a set of different successive sequences is used.

The invention claimed is:

1. A spectrum spreading data transmission process in which:
   a step of sending, including building up symbols to be sent from data to be transmitted, and modulating said symbols by spectrum spreading using pseudo-random sequences,
   a step of receiving, including correlating a received signal with the pseudo-random sequences used in sending, identifying the sent symbols, and restoring the data, the process comprising:
   a) in said sending step:
      v) building up a set of S successive different pseudo-random sequences, in which S is greater than or equal to at least 2,
      vi) grouping the symbols to be transmitted into packets each containing S successive symbols,
      vii) modulating the S successive symbols by one of the set of S successive different pseudo-random sequences,
      viii) repeating said step of modulating for successive packets with a remaining one of the set of S successive different pseudo-random sequences, the pseudo-random sequences in the set thus being used repetitively,
   b) in said receiving step:
   correlating the received signal with each of the S pseudo-random sequences used in the sending step,
   restoring the successive packets of symbols and corresponding data.

2. The process according to claim 1, in which several packets of S symbols are processed in parallel.

3. A transmitter configured to execute the step of sending recited in claim 1, comprising a general input (10), means (20) for receiving the data to be transmitted and building up symbols, and means (60) for modulating the symbols by the spectrum spreading using the pseudo-random sequences, said transmitter further comprising:

means (50) for building up the set of S successive different pseudo-random sequences means (30, 40) for grouping symbols to be transmitted into packets each containing S successive symbols, the means (60) for modulating the successive symbols of a packet by S successive pseudo-random sequences of the set of successive different pseudo-random sequences, and for reiterating the modulation for successive packets of symbols, the pseudo-random sequences of the set thus being used repetitively.

4. The transmitter according to claim 3, in which the means (60) for modulating are adapted to process several packets of S symbols in parallel.

5. A receiver configured to execute the step of receiving recited in claim 1, comprising means for correlating the received signal with the pseudo-random sequences and for outputting despread symbols, and means for recovering data from said despread symbols, said receiver further comprising:

means (110₁, ... 110_M) for correlating the received signal with S pseudo-random sequences, S being an integer greater than or equal to 2, means (120₁, ... 120_M) (130) (140₁, ..., 140_L) (150₁, ..., 150_L) for recovering packets of the S despread symbols, means (170) for recovering the transmitted data from said packets of the S despread symbols.

6. The receiver according to claim 5, in which the means (120₁, ..., 120_M) (130) (140₁, ..., 140_L) (150₁, ..., 150_L) for recovering are adapted to process several packets of successive symbols in parallel.

* * * * *